Figure 1:
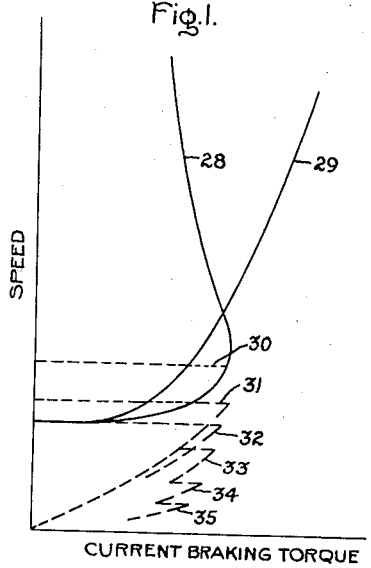

Feb. 21, 1939.        L. JANISCH        2,148,297
ELECTRIC BRAKING SYSTEM
Filed Sept. 18, 1937

Leopold Janisch
Inventor, deceased
by William A. Dodge
Administrator
by Harry E. Dunham
His Attorney.

Patented Feb. 21, 1939

2,148,297

UNITED STATES PATENT OFFICE 2,148,297

ELECTRIC BRAKING SYSTEM

Leopold Janisch, deceased, late of Berlin, Germany, by William A. Dodge, administrator, Schenectady, N. Y., assignor to General Electric Company, a corporation of New York Application September 18, 1937, Serial No. 164,587
In Germany September 19, 1936

9 Claims. (Cl. 172—179)

This invention relates to electric braking systems having particular application to electric railway motors and the like, and has for its object a simple and reliable regenerative and dynamic braking system provided with control means for establishing regenerative braking and for changing over to dynamic braking when the speed of the motor decreases to a predetermined minimum.

In regenerative braking systems for electric railway motors it is desirable to maintain the braking by regeneration of current over the greatest possible range of travelling speed as the motor speed decreases before substituting an auxiliary brake which then brakes the motor completely to a standstill. Because of cost considerations this auxiliary brake is usually a resistance or dynamic brake. The switching from the regenerative brake to the resistance brake may be done by the operator, but a certain amount of experience is necessary in order that the transfer may be completed at the correct moment to avoid variation in the braking action.

For regenerative braking systems with self-excited motors it is known to effect by automatic control means the change from the self-excited regenerative brake to a self-excited resistance brake independently of the operator and so that no brake variation is involved in the change. The switching devices used heretofore for this purpose were based either on a development of opposing electromagnetic fields or a differential action of the supply voltage and the braking voltage.

Furthermore, polarized relays with auxiliary relays have been used which respond according to the excess of the braking voltage over the supply voltage or to a minimum voltage of the braking motor. For regenerative braking with self-excitation such control devices, in order to assure maximum utilization of the regenerative brake, must be arranged in such a way that they interrupt the regenerative braking only when the regenerative current drops to a low value and also they must be capable of making the regenerative braking connection with slight excess of braking voltage over the supply voltage.

So far as regenerative braking arrangements with separate excitation are concerned, however, this late change from the regenerative brake to the resistance brake would always result in jerky braking. The regenerative braking torque would disappear almost entirely with such low values of regenerative current, the motor running idle for a short time, and then the resistance brake with separate excitation would be applied with full braking torque.

The present invention avoids the disadvantages of the above described regenerative braking system while retaining its advantages. In accordance with the invention, the switching from the separately excited regenerative brake to a separately excited resistance brake and vice versa, is effected by an electrical relay or switch which is provided with two coils, one of which is supplied by the excess of braking voltage over the supply voltage and serves to close the relay, while the other is supplied by the regenerative current and, acting as a holding coil, maintains the relay closed and supervises it, the relay inclosing short circuiting the first mentioned lifting coil.

A separate exciter generator is provided for the driving motor together with a differential field winding for the exciter, this winding being in the motor circuit and acting differentially under regenerative braking conditions so that the braking torque increases upon decrease in regenerative current up to a certain point at which it begins to decrease rapidly. This enables the transfer to dynamic braking to be made smoothly without substantial change in braking effect.

The use as a lifting coil of a differential coil excited by the excess braking voltage over the supply voltage has the advantage that voltage fluctuations in the supply source have no effect on the operation of the relay in carrying out the switching operations from regenerative to dynamic braking. The same minimum excess of braking voltage over supply voltage will always determine the lowermost switching limit of the relay, it being immaterial whether the voltage fluctuations of the network are high or low. Consequently regenerative braking is carried out with the highest of supply source voltages as well as the lowest of supply source voltages.

The control devices heretofore known must be of the lightest possible construction because of the operating requirements essential in self-excited regenerative braking systems. Also they have to overcome only a comparatively small contact pressure and they are not suitable for the operation of large contacts requiring relatively great effort. In contrast thereto, the switching relay, according to the present invention, has operating forces adapted to the varied responding and releasing requirements of regenerative braking systems with separate excitation and it is capable without undue enlargement of its size of readily applying the required power for operating the changeover contacts.

Figure 2:
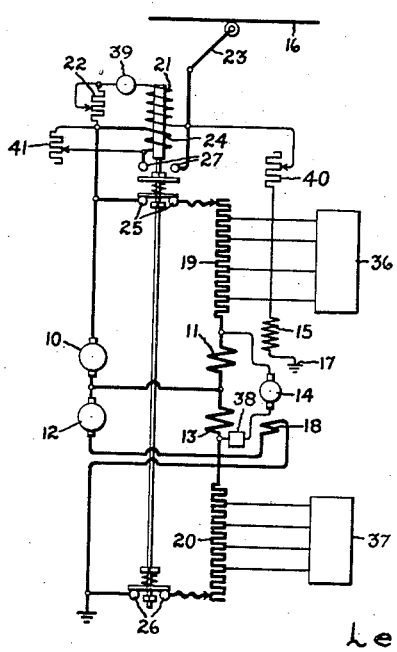

For a more complete understanding of the invention reference should be had to the accompanying drawing Fig. 1 of which consists of speed-torque or current curves showing operating characteristics of the braking system, while Fig. 2 is a diagrammatic representation of a regenerative braking system for electric vehicles embodying the invention.

Referring to Fig. 2, the invention is shown as applied to a railway motor system comprising a direct current motor consisting of an armature 10 provided with a series field winding 11 and a second direct current motor consisting of an armature 12 provided with a series field winding 13. The field windings 11 and 13 are separately excited by a substantially constant voltage exciter generator 14 which is suitably driven, for example, by a separate driving motor (not shown) connected to the supply main 16. It is provided with a separately excited field winding 15 connected directly between the supply main 16 and the common ground connection 17. The exciter 14 also is provided with a differential compound winding 18 included in circuit with the armatures 10 and 12, and arranged to oppose the winding 15 during regenerative braking. Connected in circuit with the armature 10 and its field winding 11 is a variable dynamic braking resistor 19, while a similar variable resistor 20 is provided for the armature 12.

The regenerative and dynamic braking connections for the two motors are controlled by a relay switching means operated by a voltage lifting coil 21 connected between the high voltage side of the two motors and the supply conductor 16, an adjustable protective resistance 22 being preferably included in circuit with the coil 21. Connections are established with the trolley conductor 16 by means of a suitable trolley 23. A series current coil 24 is also provided through which the regenerative current flows after the switch has been picked up by the coil 21. The two coils, when excited, act in the same direction.

As illustrated, the switching means is provided with two pairs of contacts 25 and 26 with which normally cooperate bridging contacts biased to positions to close circuits respectively across the contacts 25 and 26, as shown in the drawing, when the coils 21 and 24 are deenergized. As shown, the movable bridging contacts are biased to these positions by gravity. Therefore in the event of failure of the supply voltage, a dynamic braking action is available.

The upper bridging member, when moved to its uppermost position by energization of the voltage coil 21, closes the circuit across a third pair of contacts 27 to thereby close the regenerative braking circuit through the coil 24. In the operation of the system when the supply voltage is available and with sufficient excess braking voltage over the supply voltage for which the coil 21 is adjusted, the coil 21 lifts the bridging contacts to their uppermost positions. The minimum excess voltage over the supply voltage required to operate the switching means is predetermined, in accordance with the invention, at a value corresponding with the highest degree of efficiency of the regenerative brake after the circuit has been closed for the different braking torques corresponding to the different motor speeds. This voltage also is such that the maximum regenerative braking torque is produced after the establishment of the regenerative braking connections.

During this operation of the switching means, the upper bridging member first closes a circuit across the contacts 27 and then the dynamic braking circuits are opened by disengagement of the bridging contacts with their pairs of contacts 25 and 26. It is true that this short circuits the lifting coil 21 which is therefore rendered ineffective, but the strong current holding coil 24 then assumes the duty of completing the movement of the switching means to its final upward position. The coil 24 is capable of doing this because the critical minimum regenerative current strength is of considerable value. From now on the regenerative brake exists with separate excitation with no superimposed resistance braking.

This regenerative brake will now have the effect, as for example in railway operation, of reducing the speed of the motors from any value with a gradual action, i. e., free from jerks, whereby a gradual diminution of the regenerative current strength takes place, as shown by the speed-torque curve 28 of Fig. 1. During this action, however, the regenerative braking torque will increase in a predetermined manner as shown by the speed-current curve 29 of Fig. 1 until this torque reaches its maximum value when the decreasing regenerative current has decreased to a certain minimum value. These values of current and maximum braking torque are indicated by the points of intersection of the dotted line 30 with the curves 28 and 29.

The reason for the increase in braking torque as the speed decreases is that the differential field winding 18 on the exciter offers less opposition to the separately excited field winding 15 of the exciter as the generative braking current decreases. As a result the voltage of the exciter 14 increases and produces a correspondingly rapid increase in the excitation of the field windings 11 and 13. Consequently, the braking torque increases upon decrease in speed as indicated by the curve 28.

Upon continued decrease of the motor speed, as clearly shown in Fig. 1, the regenerative braking torque drops as indicated by the portion of the curve 28 below the dotted line 30, and the regenerative current drops as indicated by the portion of the curve 29 below the line 30, first with moderate speed and then with ever increasing rapidity to zero.

Now according to the invention, the releasing current strength for the strong current holding coil 24 is predetermined at a value which occurs when in the course of continued decrease of motor speed the regenerative braking torque has decreased so far from its high value that it is substantially equal to the peak value of the next succeeding resistance braking step. These values of torque and current at which the relay drops out are indicated by the points of intersection of the dotted dynamic braking curve 31 with the curves 28 and 29. The relay switching means is then released or drops away from the coil 24 and the bridging contacts close regenerative braking circuits across the contacts 25 and 26. The resulting variation, i. e. increase, in the braking torque is slight as indicated by a comparison with curve 28 of the dynamic braking curve 31 of Fig. 2 which is a speed-torque curve for the first step of dynamic braking with all of the resistances 19 and 20 in the circuit. This increase is below the permissible value. At the same time the briefly overlapping closed and open circuit currents of the switching relay cooperate in an expedient manner inasmuch as they preclude any interruption of braking power when the relay drops. Although, when the circuit between the contacts 27 is interrupted by the dropping of the relay, the coil 21 again receives the excess of braking voltage over the supply voltage this excess, because of the fact that the motor speed is now low, is too small to cause any hammering of the relay. Instead the relay definitely drops away.

The motor speed can now be braked down until a standstill is reached by gradually decreasing the amounts of the variable braking resistances 19 and 20 included in the circuits. This may be done in steps, as indicated by the speed-torque curves 32, 33, 34 and 35 of Fig. 1, by a braking controller, such as suitable drum controllers 36 and 37 for short circuiting sections of the resistances 19 and 20. The braking voltages thus become ever smaller and finally nil. Preferably an undervoltage relay 38 is provided in the exciter circuit for opening the circuit in the event of a failure of the voltage supplied to the main 16. The dynamic braking connections are then established.

When the braking voltage becomes less than the supply voltage, this increasing reversely directed differential voltage might energize the coil 20 so as to pick up the switch contacts and cause a dangerous rush of current through the motor from the supply source to ground. Instead, to prevent this danger, according to the invention, a suitable reverse current device 39 is provided in circuit with the coil 21 to prevent a reverse current flow. This device may take the form of a polarized relay, an electric valve or current rectifier seal. Also a reverse current through the coil 21 may be prevented by a centrifugal switch responsive to the speed of the motors, or a switch operated by a voltage coil responsive to the voltage of the motors and arranged to open when the voltage across the motors becomes less than the supply voltage. If desired, the shunt excitation of the exciter 14 may be varied by means of an adjustable resistance 40 in series with the shunt winding 15. Or the winding 15 may be provided with taps for that purpose. At the same time it is contemplated, in accordance with the invention, that the current holding coil 24 will be correspondingly adjusted in order that its releasing number of ampere turns may correspond with the new value of minimum regenerative current for the required minimum regenerative braking torque effected by the change in the separate excitation of the winding 15. For the adjustment of the coil 24 a parallel variable resistance 41 is provided, or here again taps on the coil may be used. This result is brought about by reason of the fact that the resistance braking torques in their modified form, because of the adjustment of the winding 15, correspond very closely in magnitude to the similarly modified regenerative braking torques.

Furthermore, according to the invention, in the course of regulation of the separate excitation, the excess of braking voltage over supply voltage is also re-regulated by the adjustable resistance 22 for the operation of the differential coil 21 in order that its minimum number of ampere turns may be brought about despite the fact that a variation occurs by reason of the modification of the excitation of the coil 15, in the minimum excess of braking voltage over supply voltage for the required maximum of regenerative braking torque. This is effected by reason of the fact that in changing from the resistance brake to the regenerative brake the resulting regenerative braking torque never comes into that portion of the braking movement that drops greatly with decreasing motor speed. For tramways re-regulation of this required excess voltage can be dispensed with in the majority of cases. If, however, the regulation of a separate excitation of coil 15 is restricted to two degrees of excitation then it is sufficient for tramway operation to adjust the differential lifting coil 21 and the strong current coil 24 for uniform average values.

This invention is not of course limited to braking connections where a rotating separate exciter is used. Instead of a rotating exciter a suitable storage battery may be used.

While a particular embodiment of the invention has been shown, it will be understood, of course, that it is not to be limited thereto since many modifications may be made, and it is therefore contemplated by the appended claims to cover any such modifications as fall within the true spirit and scope of the invention.

What is claimed as new and desired to be secured by Letters Patent of the United States is:—

1. The combination in an electric braking system for an electric motor provided was an armature and a separately excited field winding, a dynamic braking resistor, switching means movable for connecting said motor to a source of electrical supply for regenerative braking and for connecting said resistor in circuit with said motor for dynamic braking, a voltage coil responsive to the difference between the voltage of said motor and the voltage of said supply source for operating such switching means to establish said regenerative braking connections, and a current coil responsive to the regenerative braking current for operating said switching means to establish said dynamic braking connections in response to a predetermined regenerative braking current.

2. The combination in an electric braking system for an electric motor provided with an armature and separately excited field winding, a dynamic braking resistor, switching means movable to one position to connect said motor to a source of electrical supply for regenerative braking and movable to a second position to connect said resistor in circuit with said motor for dynamic braking, a voltage coil responsive to the difference between the voltage of said motor and the voltage of the supply source for operating such switching means to said first position and a current coil responsive to the regenerative braking current arranged to effect movement of said switching means to said second position in response to a predetermined minimum regenerative braking current.

3. The combination in an electric braking system for an electric motor provided with an armature and a separately excited field winding, a dynamic braking resistor, switching means movable to one position to connect said motor to a source of electrical supply for regenerative braking and movable to a second position to connect said resistor in circuit with said motor for dynamic braking, a voltage coil responsive to the difference between the voltage of said motor and the voltage of the supply source for operating such switching means to said first position and a current coil responsive to the regenerative braking current arranged to effect movement of said switching means to said second position in response to a predetermined minimum regenerative braking current, said resistor being arranged to provide a dynamic braking torque substantially equal to the regenerative braking torque at the time of the establishment of said dynamic braking connections.

4. The combination in an electric braking system for an electric motor provided with an armature and a separately excited field winding, a dynamic braking resistor, switching means movable to one position to connect said motor to a source of electrical supply for regenerative braking and movable to a second position to connect said resistor in circuit with said motor for dynamic braking, a voltage coil responsive to the difference between the voltage of said motor and the voltage of the supply source for operating such switching means to said first position, said switching means being arranged to disable said voltage coil in establishing said regenerative braking connections, and a current coil responsive to the regenerative braking current for holding said switching means to maintain said regenerative braking connections, said current coil being arranged to release said switching means and thereby establish dynamic braking in response to a regenerative current less than a predetermined value.

5. The combination in an electric braking system for electric traction motors and the like, supply connections for connecting said motor to a source of electrical supply, a motor provided with an armature and a series field winding, a dynamic braking resistor for connection in circuit with said motor, means for exciting said field winding independently of the current in the motor circuit, switching means movable to one position to connect said armature to said supply connections for regenerative braking and biased to a second position to connect said armature in circuit with said resistor for dynamic braking, a voltage coil responsive to the excess of voltage of said motor over the voltage of the supply source for operating said switching means to establish said regenerative braking connections, said switching means being arranged to short circuit said voltage coil in establishing said regenerative braking connections, and a current coil responsive to the regenerative braking current for maintaining said regenerative braking connections, said current coil being arranged to release said switching means and thereby establish said dynamic braking connections in response to a predetermined low value of regenerative current corresponding to a regenerative braking torque substantially equal to the dynamic braking torque upon the establishment of said dynamic braking connections.

6. The combination in an electric braking system for electric traction motors and the like, supply connections for connecting said motor to a source of electrical supply, a motor provided with an armature and a series field winding, a dynamic braking resistor for connection in circuit with said motor, means for exciting said field winding independently of the current in the motor circuit, switching means movable to one position to connect said armature to said supply connections for regenerative braking, said field winding not being included in said regenerative braking circuit and biased to a second position to connect said armature in circuit with said field winding and said resistor for dynamic braking, a voltage coil responsive to the excess of voltage of said motor over the voltage of the supply source for operating said switching means to establish said regenerative braking connections said switching means being arranged to short circuit said voltage coil in establishing said regenerative braking connections, and a current coil responsive to the regenerative braking current for maintaining said regenerative braking connections, said current coil being arranged to release said switching means and thereby establish said dynamic braking connections in response to a predetermined low value of regenerative current corresponding to a regenerative braking torque substantially equal to the dynamic braking torque upon the establishment of said dynamic braking connections.

7. The combination in an electric braking system for an electric motor provided with an armature and a series field winding, a dynamic braking resistor for connection in circuit with said motor and said field winding for dynamic braking, connections for connecting the armature of said motor to a source of electrical supply with said field winding excluded for regenerative braking, an exciter generator connected to said field winding, a separately excited field winding for said exciter and an auxiliary field winding for said exciter connected permanently in circuit with said armature so as to oppose said separately excited field winding and thereby effect an increase in regenerative braking torque upon a decrease in the speed and current of said motor.

8. The combination in an electric braking system for an electric motor provided with an armature and a series field winding, a dynamic braking resistor for connection in circuit with said motor and said field winding for dynamic braking, connections for connecting the armature of said motor to a source of electrical supply with said field winding excluded for regenerative braking, an exciter generator connected to said field winding, a separately excited field winding for said exciter, an auxiliary field winding for said exciter connected permanently in circuit with said armature so as to oppose said separately excited field winding and thereby effect an increase in regenerative braking torque upon a decrease in the speed and current of said motor, switching means movable to one position to establish said regenerative braking connections and to a second position to establish said dynamic braking connections, a voltage coil responsive to the difference between the voltage of said motor and the voltage of said supply source for operating such switching means to said first position and a current coil responsive to the regenerative braking current arranged to effect movement of said switching means to said second position in response to a predetermined minimum regenerative braking current.

9. The combination in an electric braking system for an electric traction motor or the like, a supply connection for connecting said motor to a source of electrical supply, a motor provided with an armature and a series field winding, a dynamic braking resistor for connection in circuit with said motor, an exciter generator connected to said field winding, a separately excited field winding for said exciter, an auxiliary field winding for said exciter connected in circuit with said motor to oppose said separately excited field winding to effect an increase in regenerative braking torque upon a decrease in speed and regenerative current to a predetermined current value, switching means movable to one position to connect said armature to said supply connection with said field winding excluded for regenerative braking and to a second position to connect said armature in circuit with said field winding and said resistor for dynamic braking, a voltage coil responsive to the excess of voltage of said motor over the voltage of the supply source for operating said switching means to establish said regenerative braking connections, said switching means being arranged to short circuit said voltage coil in establishing said regenerative braking connections, and a current coil responsive to the regenerative braking current for holding said switching means to maintain said regenerative braking connections, said current coil being arranged to release said switching means and thereby establish dynamic braking in response to a regenerative current less than said predetermined value, said resistor being arranged to provide a dynamic braking torque substantially equal to the regenerative braking torque upon the establishment of said dynamic braking connections.

WILLIAM A. DODGE,
*Administrator of the Estate of Leopold Janisch, Deceased.*